(12) United States Patent
Reyal et al.

(10) Patent No.: US 8,549,800 B2
(45) Date of Patent: Oct. 8, 2013

(54) BEARING FRAME FOR A PANEL SUCH AS A PHOTOELECTRIC PANEL AND BUILDING EXTERNAL WALL INCLUDING SUCH FRAMES

(75) Inventors: Jean-Pierre Reyal, Eragny (FR); Yves Jautard, Vernet les Bains (FR)

(73) Assignees: Aperam Alloys Imphy, Saint Denis (FR); Solarte, Ria Sirach (FR)

( * ) Notice: Subject to any disclaimer, the term of this patent is extended or adjusted under 35 U.S.C. 154(b) by 198 days.

(21) Appl. No.: 12/596,621

(22) PCT Filed: Apr. 17, 2008

(86) PCT No.: PCT/FR2008/050689
§ 371 (c)(1),
(2), (4) Date: Mar. 18, 2010

(87) PCT Pub. No.: WO2008/145903
PCT Pub. Date: Dec. 4, 2008

(65) Prior Publication Data
US 2010/0162641 A1    Jul. 1, 2010

(30) Foreign Application Priority Data
Apr. 20, 2007 (FR) ..................... 07 54611

(51) Int. Cl.
*E04D 13/18* (2006.01)
*E04C 2/52* (2006.01)

(52) U.S. Cl.
USPC ..................... 52/173.3; 52/220.1

(58) Field of Classification Search
USPC ............ 52/200, 22, 173.3, 251, 586.1, 582.1, 52/656.1, 665; 136/244, 251; 126/623, 126/704; 403/292
See application file for complete search history.

(56) References Cited

U.S. PATENT DOCUMENTS

| 5,524,401 | A  |   | 6/1996  | Ishikawa et al. |
|-----------|----|---|---------|-----------------|
| 6,065,255 | A  | * | 5/2000  | Stern et al. ................... 52/173.3 |
| 6,111,189 | A  | * | 8/2000  | Garvison et al. .............. 136/244 |
| 6,128,868 | A  | * | 10/2000 | Ohtsuka et al. .............. 52/173.3 |
| 6,465,724 | B1 | * | 10/2002 | Garvison et al. .............. 136/244 |
| 6,670,541 | B2 | * | 12/2003 | Nagao et al. .................. 136/251 |

(Continued)

FOREIGN PATENT DOCUMENTS

DE  10 2005 019 857 A1  1/2006
EP  0 619 404 A2  10/1994

(Continued)

*Primary Examiner* — Brian Glessner
*Assistant Examiner* — Beth Stephan
(74) *Attorney, Agent, or Firm* — Sughrue Mion, PLLC

(57) ABSTRACT

The invention relates to a bearing frame for a panel, of the type comprising a peripheral structure (1, 1') for receiving a panel (20), including at least three mounts (2, 3, 4, 5, 2', 3', 4', 5') defining a frame in which the lower face defines a reference plane (P, P'), in which at least one mount (2, 5; 5) includes a wing (90,100; 90') extending on the entire length thereof towards the outside of the frame in parallel with the upper face of the frame, the frame comprising at least one precut metal strip (30) stamped, folded and assembled by welding, in particular laser welding, characterised in that the peripheral structure (1, 1') is hollow and in that it further comprises inner and outer connection means (14, 16, 17) and an electric linking means (18) between the inner and outer connection means, provided inside the hollow peripheral structure.

20 Claims, 10 Drawing Sheets

(56) References Cited

U.S. PATENT DOCUMENTS

| | | | |
|---|---|---|---|
| 7,012,188 B2 * | 3/2006 | Erling | 136/251 |
| 7,406,800 B2 * | 8/2008 | Cinnamon et al. | 52/173.3 |
| 7,726,301 B2 * | 6/2010 | Shin et al. | 126/704 |
| 7,900,407 B2 * | 3/2011 | Plaisted | 52/173.3 |
| 2001/0050102 A1 * | 12/2001 | Matsumi et al. | 136/244 |
| 2003/0150114 A1 | 8/2003 | Reyal | |
| 2005/0257453 A1 * | 11/2005 | Cinnamon | 52/173.3 |

FOREIGN PATENT DOCUMENTS

| | | |
|---|---|---|
| EP | 1 813 738 A1 | 8/2007 |
| JP | 2000-129869 A | 5/2000 |
| WO | 02/05979 A1 | 1/2002 |
| WO | 2005/012667 A1 | 2/2005 |
| WO | 2006/043658 A1 | 4/2006 |
| WO | 2006/076719 A2 | 7/2006 |
| WO | 2006/136365 A1 | 12/2006 |

* cited by examiner

BEARING FRAME FOR A PANEL SUCH AS A PHOTOELECTRIC PANEL AND BUILDING EXTERNAL WALL INCLUDING SUCH FRAMES

CROSS REFERENCE TO RELATED APPLICATION

This application is a National Stage of International Application No. PCT/FR2008/050689 filed Apr. 17, 2008, claiming priority based on French Patent Application No. 07 54611, filed Apr. 20, 2007, the contents of all of which are incorporated herein by reference in their entirety.

BACKGROUND OF THE INVENTION

The invention relates to a supporting frame for a panel comprising a peripheral structure for receiving a panel such as a photovoltaic cell panel.

This supporting frame for a panel is intended, in particular, for supporting panels disposed on a wall of a building and in particular on a roof or on a façade.

In order to equip buildings such as houses with electricity generators which employ solar energy, sets of panels consisting of a plurality of photovoltaic cells are disposed, for example, on the roof of these buildings. These panels generally consist of a stack of differing layers of glass, silicon, conductors and polymers. The sides of the generally square silicon cells can be as great as 200 mm. The cells are connected in series then bonded between two sheets of glass or between one sheet of glass and differing layers of polymer. By way of example, a module having a nominal voltage of 12 V is generally constructed by connecting 36 monocrystalline or polycrystalline cells in series. These assemblies of 36 cells are then connected in parallel. 72 silicon cells are thus used in the case of a 24 V module.

These photovoltaic panels or modules are disposed on frameworks of which the uprights consist of assembled aluminium profiles which impart mechanical rigidity to them and enable them to be fixed on the roof. In addition, the panels are connected to one another and to a distribution circuit for powering electrical installations.

Generally, a plurality of panels are disposed side by side so as to form a large active surface area. It is thus necessary to provide a good seal at the joints between two adjacent frames so as to avoid infiltration of water in the event of rain or snowfall. For this purpose, seals are produced in the regions of the joint between two adjacent panels.

However, these seals are sometimes difficult to produce and do no always produce a satisfactory seal.

In addition, the aluminium frameworks are fairly bulky owing to the poor mechanical properties of this metal. In addition, they may also sometimes have unsatisfactory corrosion characteristics. Finally, they necessitate considerable labour costs for the positioning thereof and in particular for the production of the seals.

Finally, the aluminium frameworks are not always suitable for producing electrical joints between the panels of photovoltaic cells and the exterior, and in particular with the photoelectric panels supported by adjacent frameworks.

SUMMARY OF THE INVENTION

The object of the present invention is to overcome these drawbacks by proposing a supporting means for panels such as electrically active panels and, in particular, photovoltaic panels or modules which provide a reliable seal and which are easy to position. This supporting means for electrically active panels can also have the advantage of being lighter than known frameworks. It can also allow the production of electrical joints which do not adversely affect the appearance of the surfaces formed by these sets of panels.

The invention accordingly relates to a supporting frame for a panel comprising a peripheral structure for receiving a panel, consisting of at least three uprights forming a framework of which the lower face forms a reference plane. At least one upright comprises a fin extending over the entire length thereof and toward the exterior of the framework, parallel to the upper face of the framework. The frame consists of at least one precut, stamped and folded metal strip which is assembled by welding, in particular by laser welding. The peripheral structure is hollow and the supporting frame for a panel further comprises internal and external connection means and an electrical linking means between the internal and external connection means disposed inside the hollow peripheral structure.

The metal strip may be made of steel, in particular of austenitic stainless steel, of an optionally lacquered, galvanized low-carbon steel, of an alloy having controlled expansion of the iron nickel type or of the ferritic stainless steel type.

Preferably, the metal strip consists of a material having a coefficient of expansion between $4 \times 10^{-6}$/K and $11 \times 10^{-6}$/K, compatible with that of glass.

The height between the lower face of the fin extending on the exterior of the framework and the reference plane of the framework is greater than the height between the reference plane of the framework and the upper face of the upright located opposite the upright comprising the fin extending toward the exterior of the framework.

Two adjacent uprights can each comprise a fin extending along the entire length thereof and toward the exterior of the framework, parallel to the upper face of the framework.

At the joint between two uprights of the framework which carry fins extending toward the exterior of the framework, at least one fin extends toward the exterior of the framework parallel to the longitudinal direction of the upright carrying said fin, so as to form a joint between the two adjacent fins in such a way that the two adjacent fins form a continuous fin extending along the corner of the framework formed by the two adjacent uprights.

Preferably, the joint between the two fins comprises a stamped region toward the top of the framework and adapted to be fitted on at least one end of a fin extending toward the exterior of a framework.

Preferably, the corners of the ends of the adjacent fins located opposite the region of the joint between the two fins are cut at 45°.

The central portion of the frame, delimited by the peripheral structure, is generally open.

It may be intended to receive an electrically active panel such as a panel of photovoltaic cells and the internal and external connection means and the electrical linking means between the internal and external connection means are adapted to electrically connect an electrically active panel carried by the frame to a circuit external to the frame.

Preferably, the peripheral structure comprises, at its upper portion, a groove extending over the entire internal periphery thereof and intended to receive the periphery of a panel.

The invention also relates to the external wall of a building comprising an assembly of frames according to the invention disposed in such a way as to form a paving.

The assembly of frames can comprise at least one column of rectangular frames disposed one above the other. An adjacent upper frame and lower frame are disposed in such a way that the framework upright located at the lower portion of the upper frame comprises a fin which extends above the framework upright located at the upper portion of the lower frame.

The frames can comprise a single fin extending along an upright. The assembly of frames thus comprises at least two adjacent columns of frames and a gutter extending over the entire height of the assembly of frames is disposed against the lateral edges of the frames facing one another, so as to overlap the space located between the two columns.

The frames can also comprise two fins extending along two adjacent uprights of the framework. The assembly of frames comprises at least two adjacent columns of frames and along the line joining two adjacent columns, the frames of one column comprise fins which extend above side uprights of the frames of the other column.

Preferably, masks extend at least along the lateral edges and the upper horizontal edge of the assembly, overlapping the uprights of the frames located at the periphery of the assembly.

Seals can be disposed between the uprights of frames and the fins, gutters and masks overlapping these uprights so as to provide the seal.

The external wall of a building can constitute a roof while the frames support photoelectric panels.

BRIEF DESCRIPTION OF THE DRAWINGS

The invention will now be described in a more specific but non-limiting manner with reference to the accompanying figures, in which.

DETAILED DESCRIPTION OF THE INVENTION

Figure 1:
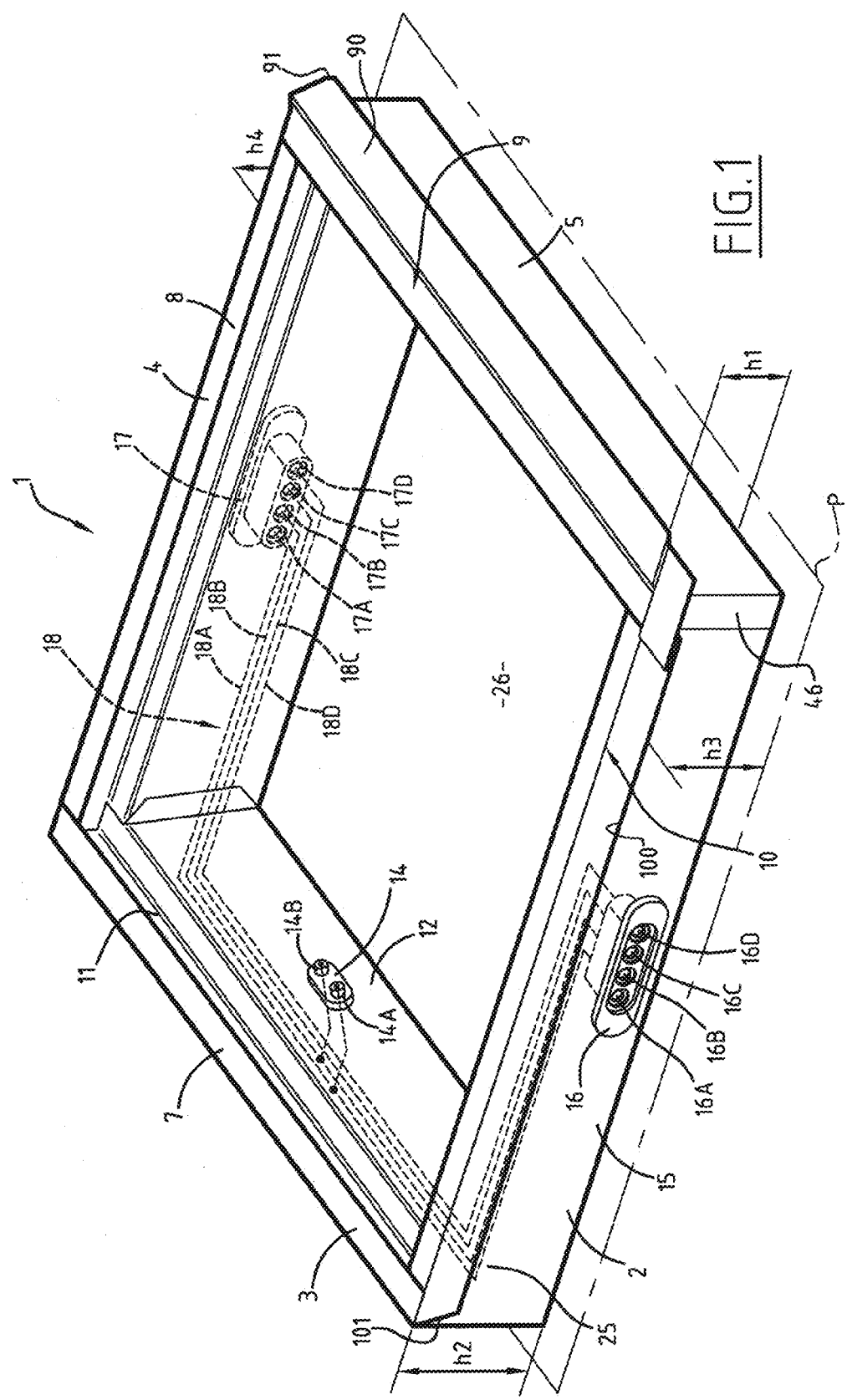
FIG. 1 is a perspective view of a supporting frame for an electrically active panel.

A first embodiment of a supporting frame for a panel as shown in FIG. 1 will first be described. This frame is intended to support an electrically active panel of the photoelectric cell panel type for creating an electrical generator based on solar energy disposed on the roof of a building.

This frame, which supports a panel, comprises a peripheral structure denoted generally by 1 in FIG. 1, in the form of a rectangular frame consisting of four uprights 2, 3, 4, 5. These uprights comprise, at their upper portion, horizontal flaps 7, 8, 9, 10 which are folded down inwardly and delimit, at the periphery of the framework, a groove 11 which is oriented toward the interior of the framework and intended to receive an electrically active panel, such as a photovoltaic cell panel.

Two flaps 9 and 10 corresponding to two adjacent sides 2 and 5 also extend toward the exterior of the framework so as to form fins 90, 100 for providing the seal between two adjacent frames, as will be explained hereinafter. The frameworks are intended to be disposed side by side so as to produce a surface paving, for example of a roof. It is necessary to be able to provide the seal along the lines separating two adjacent frameworks of frame on such a paving.

Each upright 2, 3, 4, 5 of the framework, which constitutes the peripheral structure of the frame, is hollow, in particular so as to be able to receive electrical connection means. As will be described hereinafter, it is produced by folding a metal strip.

The internal wall 12 of the upright 3 includes a connector 14 comprising two studs 14A and 14B for the connection of an electrically active panel which is supported by the frame. This connector 14 is, for example, a connector comprising a body made of plastics material overmoulded in a hole provided on the face 12 of the upright 3.

The external face of the upright 2, which is perpendicular to the upright 3, comprises an external connection means 16 which is also overmoulded in a hole provided on the wall 15 of the upright 2. This external connection means comprises four connecting studs 16A, 16B, 16C and 16D. Similarly, the external wall of the upright 4 opposite the upright 2 (not shown in the figure) is provided with a second external connection means 17 which is also overmoulded and also comprises four connecting studs 17A, 17B, 17C and 17D.

The differing studs of the external connection means 16 and 17 and of the internal connection means 14 are connected to one another by an electrical linking means 18. This electrical linking means comprises a plurality of cables 18A, 18B, 18C, 18D for producing links between the differing studs of the differing connection means so as to produce links suited to the use of the frame.

This electrical linking means has the advantage of being disposed inside the hollow uprights and thus of not being visible from the exterior of the frames and thus of permitting units having a satisfactory appearance.

The internal connection means, external connection means and connecting circuits between these differing connection means enable sets of panels to be interconnected, so as to produce series connections or parallel connections, for example in the case of electricity generating panels. The person skilled in the art knows how to produce such assemblies.

Other assemblies are possible and the person skilled in the art knows how to determine the links required for each application as a function, in particular, of the nature of the electrically active panel disposed on the frame.

As mentioned hereinbefore, the uprights 2, 3, 4 and 5 constitute a framework which forms the hollow peripheral structure surrounding a central portion 26 which is generally open. However, there is nothing to prevent this central portion 26 from being closed by a panel disposed in the bottom of the framework.

The fins 90 and 100 which extend along the uprights 5 and 2 and will produce the seal at the joint between two adjacent frames will now be described in greater detail so as to indicate how these fins are adapted to allow assemblies having a good seal.

A reference plane P which is defined by the lower face of the frame is considered for this purpose. The fin 90 is produced in such a way that its upper face is located at a height h1 above the reference plane P which is greater than or equal to the height h2 separating the plane P and the upper face of the upright 3 formed by the flap 7.

With this arrangement, and as will be mentioned hereinafter, the upright 3 of a frame can slide below the flap of the corresponding opposite side of a second adjacent frame. Similarly the height h3 between the plane P and the lower face of the fin 100 extending toward the exterior along the upright 2 is greater than or equal to the height h4 between the plane P and the upper face of the upright formed by the flap 8. As in the previous case, this arrangement allows the upright 4 of a frame to be slid below the corresponding external fin on the opposite side of a second frame adjacent to the first frame.

The fins 90 and 100 are also shaped so as to be able to produce assemblies of a plurality of frames and, in particular, to allow the production of pavings of frames so as to cover a surface, for example a roof pan.

The fin 100 of the upright 2 is generally planar and comprises, at its end located on the side with the upright 3, which does not comprise an outwardly extending fin, a cut corner 101 which is cut at 45° so that it can be connected to the fin of a second frame of which the corner is juxtaposed with the corner of the frame in question.

The fin 100 extends along the entire length of the upright 2 without extending beyond the length of this upright.

The fin 90 extending along the upright 5, as in the previous case, comprises a cut corner 91 which is located at the angle of the frame producing the joint between the upright 5 and the adjacent upright 4 which does not comprise an outwardly extending fin.

Figure 4:
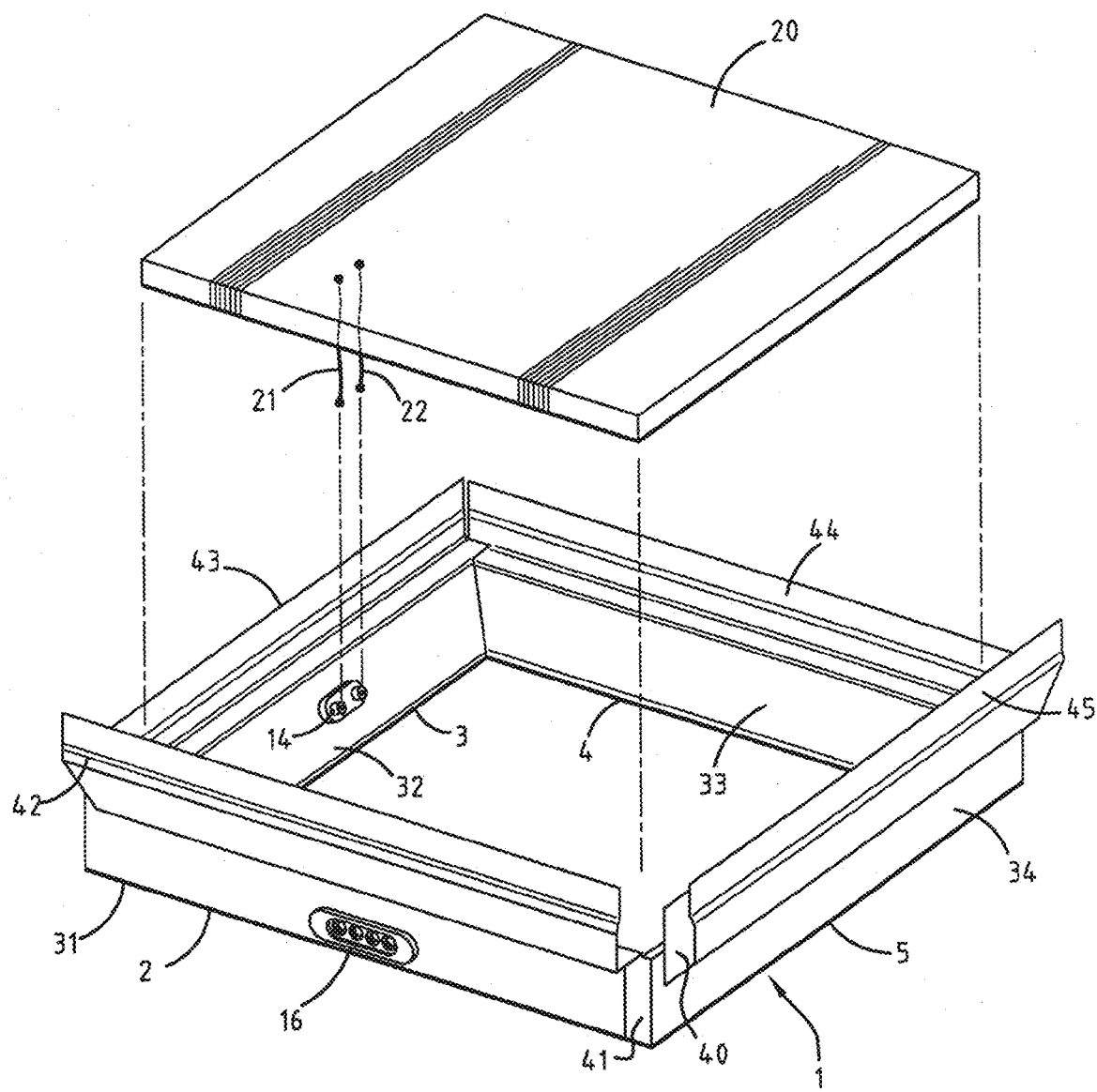
FIG. 4 is an exploded view of a supporting frame for a panel on which an electrically active panel such as a photoelectric cell panel is mounted.
Figure 5:
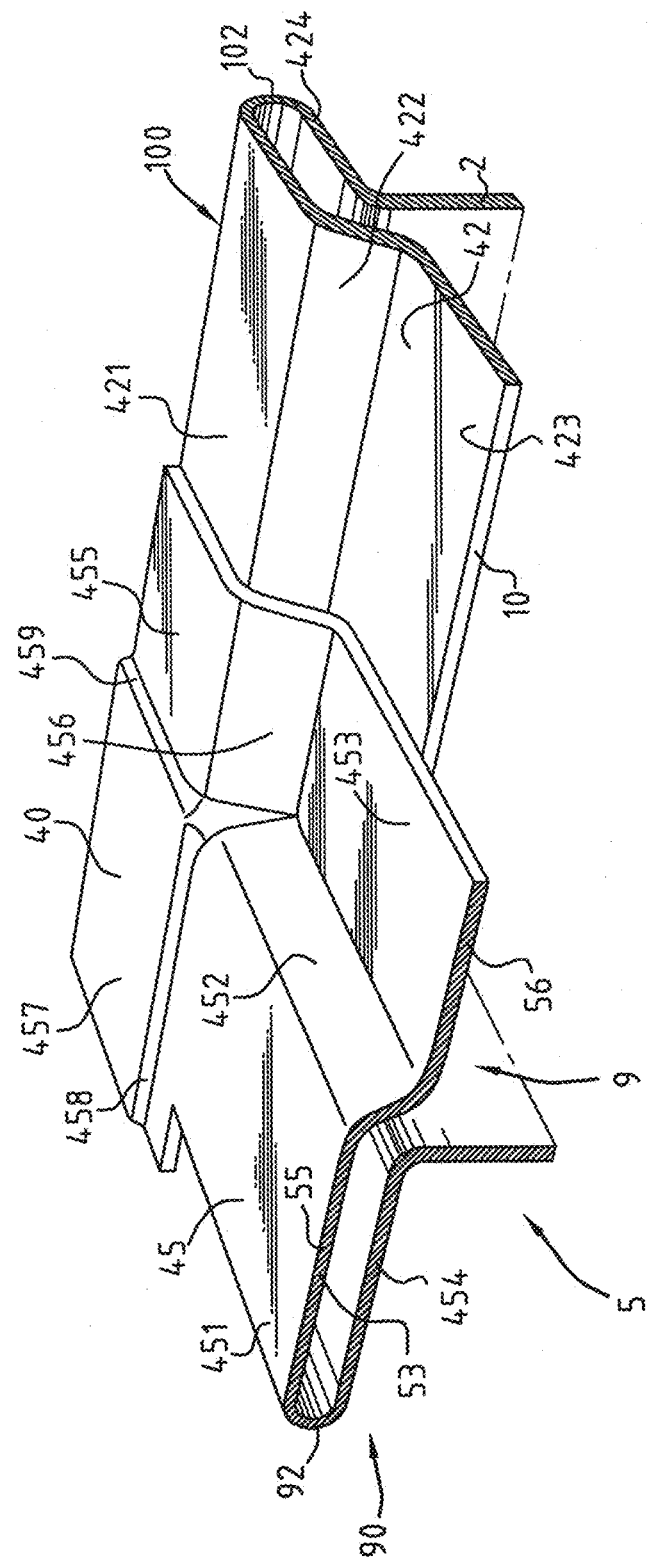
FIG. 5 is a partial perspective view of a corner of a frame as shown in FIG. 1, comprising two fins for providing the seal between two adjacent frames.
Figure 6:
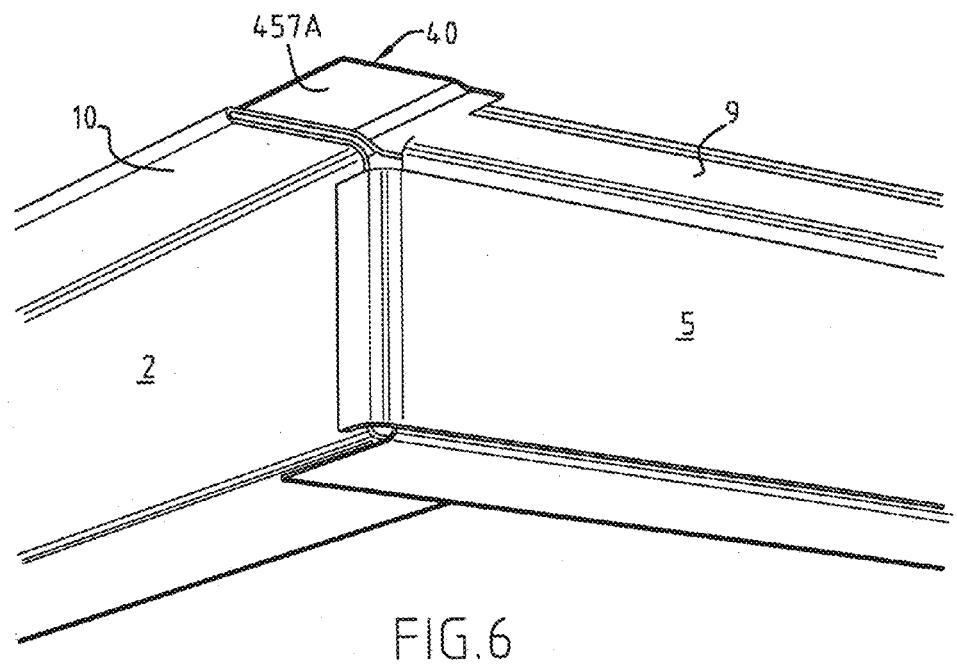
FIG. 6 is a perspective view, from the exterior, of the corner of a frame as shown in FIG. 5.

Referring to FIGS. 4, 5 and 6, in particular, the fins of the uprights 2 and 5 will now be described in greater detail.

The upper portion of the upright 2, which forms the fin 100 and the flap 10, comprises a lower strip 424 which extends outwards and is lengthened by an apron 42 which has been turned down by folding round the external edge 102 of the fin 100. This apron comprises a first external horizontal strip 421 which, owing to the folding, is located above the lower strip 424. This external strip 421 is extended by a level-change strip 422 which produces the joint to the internal strip 423 extending toward the interior of the framework. This strip 423 delimits the upper portion of the groove 11 which is intended to receive a panel carried by the frame.

The level-change strip 422 is sufficiently high for the face 423 to be located, relative to the plane P, at a lower height than the lower strip 424 which extends toward the exterior of the framework.

The fin 90 of the adjacent upright 5 is formed in the same way by a lower strip 454 which extends horizontally toward the exterior of the framework and is continued by an apron 45 folded about a fold line 92 corresponding to the external edge of the fin 90. The portion of the fin which extends along the length of the upright 5 comprises a first upper strip 451 which is separated by a level-change strip 452 from an internal strip 453 extending along the upright 5 and forming the upper face of the groove 11 intended to receive a framework.

The height of the level-change strip 452 is adapted so that the internal strip 453 of the apron 45 comes into contact with the internal strip 423 of the apron 42 of the adjacent upright.

As mentioned hereinbefore, the flap 45 forming the upper portion of the fin 90 is extended by a vane 40 which comprises a first planar plate 455 adapted to come into contact with the external strip 41 of the fin 100, and a second plate 457 disposed slightly above the plate 455 and which is intended to form a seat 457A which is shown in FIG. 6 and is intended to adapt itself to the corners of adjacent frameworks when the frameworks are disposed in such a way as to constitute a paving. The plates 455 and 457 are interconnected by a level-change strip 459 and, at the strips forming the upper face of the flap 45, by level-change strips 458 and 456.

It will now be described how the frameworks can be disposed side by side so as to form a paving while producing a good seal between two adjacent frameworks.

Figure 7:
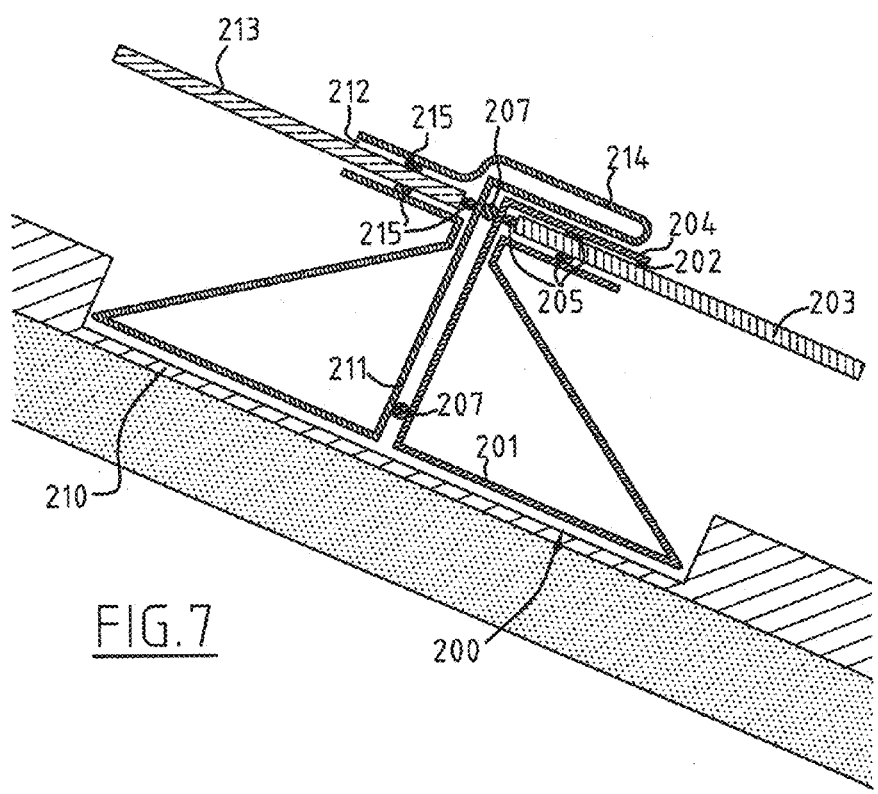
FIG. 7 is a section of the joint between two supporting frames for adjacent panels.
Figure 8:
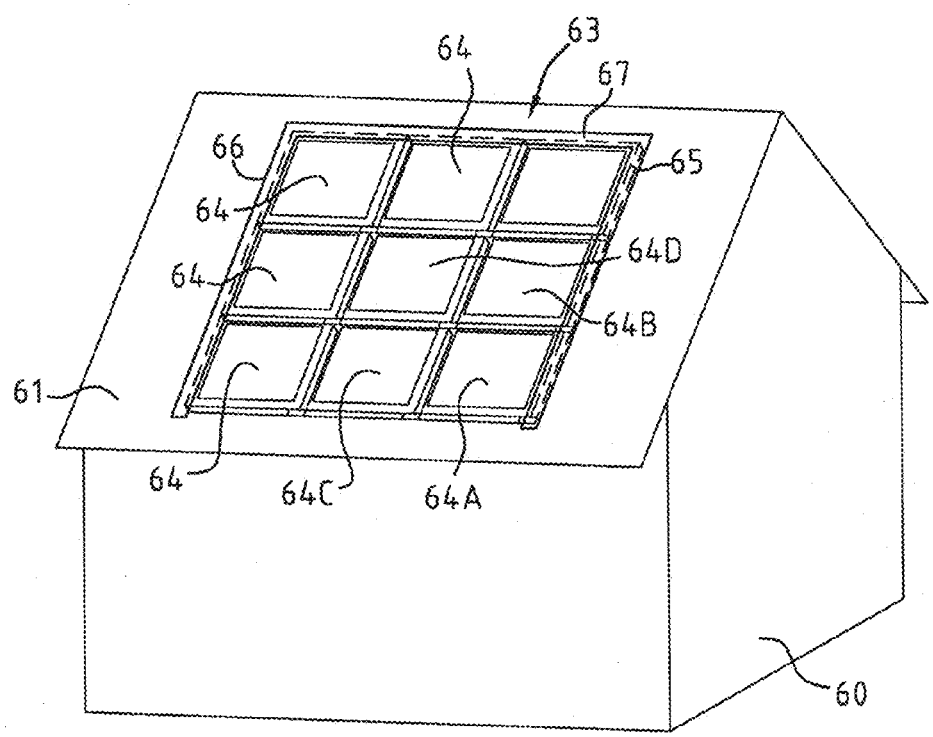
FIG. 8 is a schematic view of an assembly of panel-supporting frames of the type shown in FIG. 1 disposed on the roof of a building.

Reference will first be made to FIG. 7, which is an enlarged section of the joint between a first framework 200 and an adjacent second framework 210. It is assumed that these frames are mounted on an inclined surface such as a roof pan, and that the framework 200 is downstream of the framework 210. The framework 200 comprises an upright 201 of which the upper portion comprises a flap 204 extending inwardly and delimiting a groove 202 which receives the edge of a panel 203. Joints 205 are disposed in this groove so as to produce a good seal.

The frame disposed upstream 210 comprises a lateral upright 211 which extends parallel to the upright 201 of the downstream framework 200. The lateral upright 211 of the upstream framework comprises, at its upper portion, an external fin 214 extending toward the exterior of the framework and overlapping the upper flap 204 of the upright 201 of the downstream framework 200.

The external fin 214 is lengthened toward the anterior of the framework by a flap 215 which delimits a groove 212 receiving a panel 213. Seals 215 are disposed between the panel 213 and the edges of the groove 212 to produce the seal. Seals 207 are provided between the uprights 201 of the downstream panel and 211 of the upstream panel 210, to produce, on the one hand, resilient contact between the panels and, on the other hand, a degree of sealing.

The external fin 214 of the upstream panel 210 can overlap the upper portion of the upright 201 of the downstream panel 200 because, as mentioned hereinbefore, the height between the reference plane of the frameworks and the lower face of the fin 214 is greater than the height separating the reference plane of the frameworks and the upper face of the flap 204 of the downstream framework 200.

This arrangement of the two frameworks, one on top of the other, produces a seal in the same way as roof tiles, this seal resulting from the upstream frame partially overlapping the downstream frame.

Figure 9:
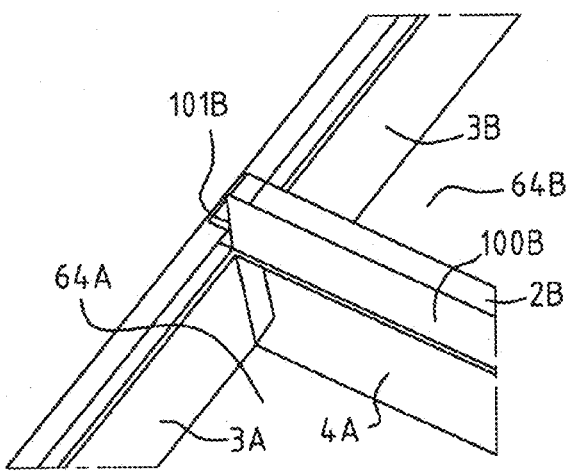
FIGS. 9, 10 and 11 are detailed views of the assembly and joining of four supporting frames for adjacent panels.
Figure 10:
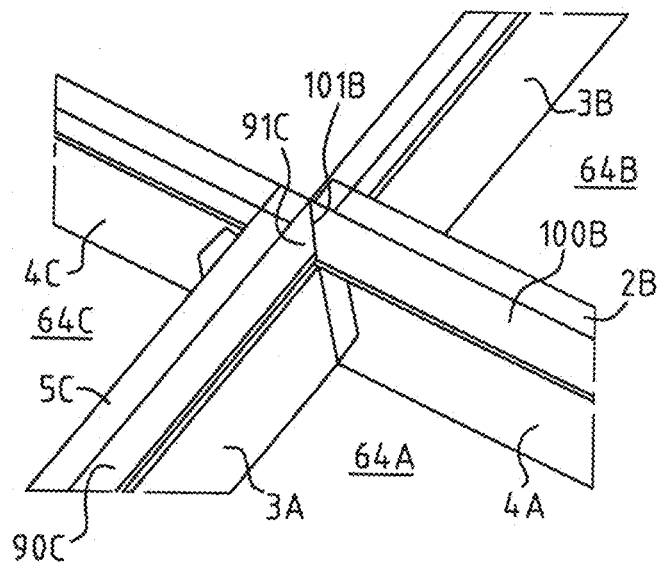
Figure 11:
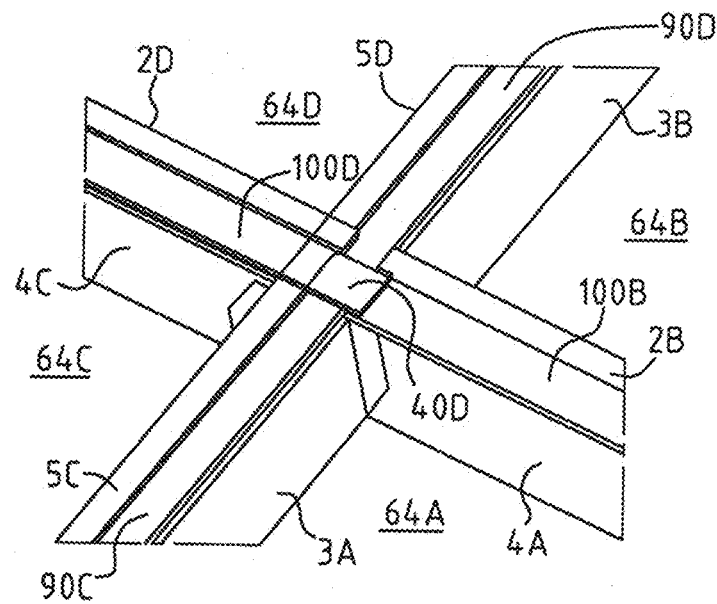

FIGS. 9, 10 and 11 show three stages of assembly of four adjacent frameworks so as to form a square.

FIG. 9 shows a first framework 64A of which the upright 4A is adjacent to the upright 2B of a frame 64B located upstream of the framework 64A.

The uprights 3A and 3B which are adjacent to the uprights 4A and 2B respectively of the frameworks 64A and 64B are in the extension of one another.

The upright 2B of the framework 64B comprises an external fin 100B which overlaps the upper portion of the lateral upright 4A of the framework 64A. The cut corner 101B of the fin 100B of the framework 64B fits above the joint between the uprights 3 and 4A of the framework 64A.

FIG. 10 shows the foregoing assembly, to which there has been added a third framework 64C which is disposed to the side of the framework 64A adjacent to the upright 3A of the framework 64A. The framework 64C has an upright 5C adjacent to the upright 3A of the framework 64A and an upright 4C which enters the extension of the upright 4A of the framework 64A. The upright 5C of the framework 64C comprises an external fin 90C which overlaps the upper face of the upright 3A of the framework 64A. The cut corner 91C of the fin 90C of the framework 64C fits with the cut corner 101B of the fin 100B of the framework 64D. The uprights 3A and 4A of the frame 64A are thus covered by the external fins 90C and 100B of the frames 64C and 64B respectively. In addition, the upper faces of the fins 90C and 100B of the two frames 64C and 64B are at the same level, but form an excess thickness relative to the upper faces of the uprights 4C and 3B of the frames 64C and 64D.

FIG. 11 shows the set of the aforementioned 3 frames to which there has been added a fourth frame 64D comprising an upright 2D adjacent to the upright 4C of the frame 64C and an upright 5D adjacent to the upright 3B of the framework of the frame 64B. The upright 5D of the frame 64D comprises a fin 90D extending outwardly and coming above the upper face of the upright 3B of the frame 64B. Similarly, the upright 2D of the frame 64D comprises an external fin 100D which overlaps the upper face of the upright 4C of the frame 64C. As mentioned hereinbefore, the fin 90D is lengthened by a paddle 40D which covers the joint between the cut corners 10 and 101B of the fins 90C and 100B of the frames 64C and 64B respectively.

Owing to the above-described shaping thereof, the paddle 40D adapts to differences in level resulting from the presence of the differing fins of the differing frames. The four frames therefore adjust perfectly in such a way that the upstream frames at least partially overlap the edges of the downstream frames and thus produce a good seal, in particular a seal from rain when these frames are mounted on roofs.

The frame as just described and the assembly of these frames allow a surface consisting of adjacent frames for supporting panels 64 of which the joints are tight to be produced on a roof 61 of a building 60. In particular, four frames 64A, 64B, 64C and 64D.

In order to produce a perfect seal for this set, the surface covered with frames or panels 64 is surrounded by flaps 63 extending along the upper edge of the surface of panels, and lateral flaps 65 and 66 covering the lateral edges of surface covered with panels.

Figure 2:
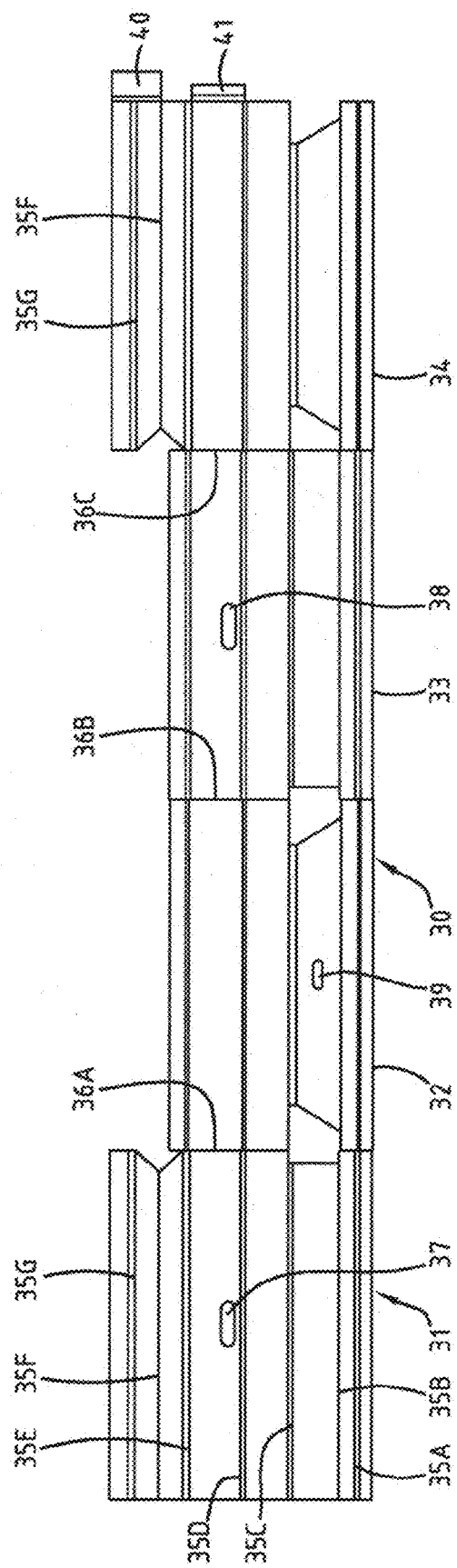
FIG. 2 is a schematic view of a cut-out pre-folded metal strip for the production of a supporting frame for a panel as shown in FIG. 1.
Figure 3:
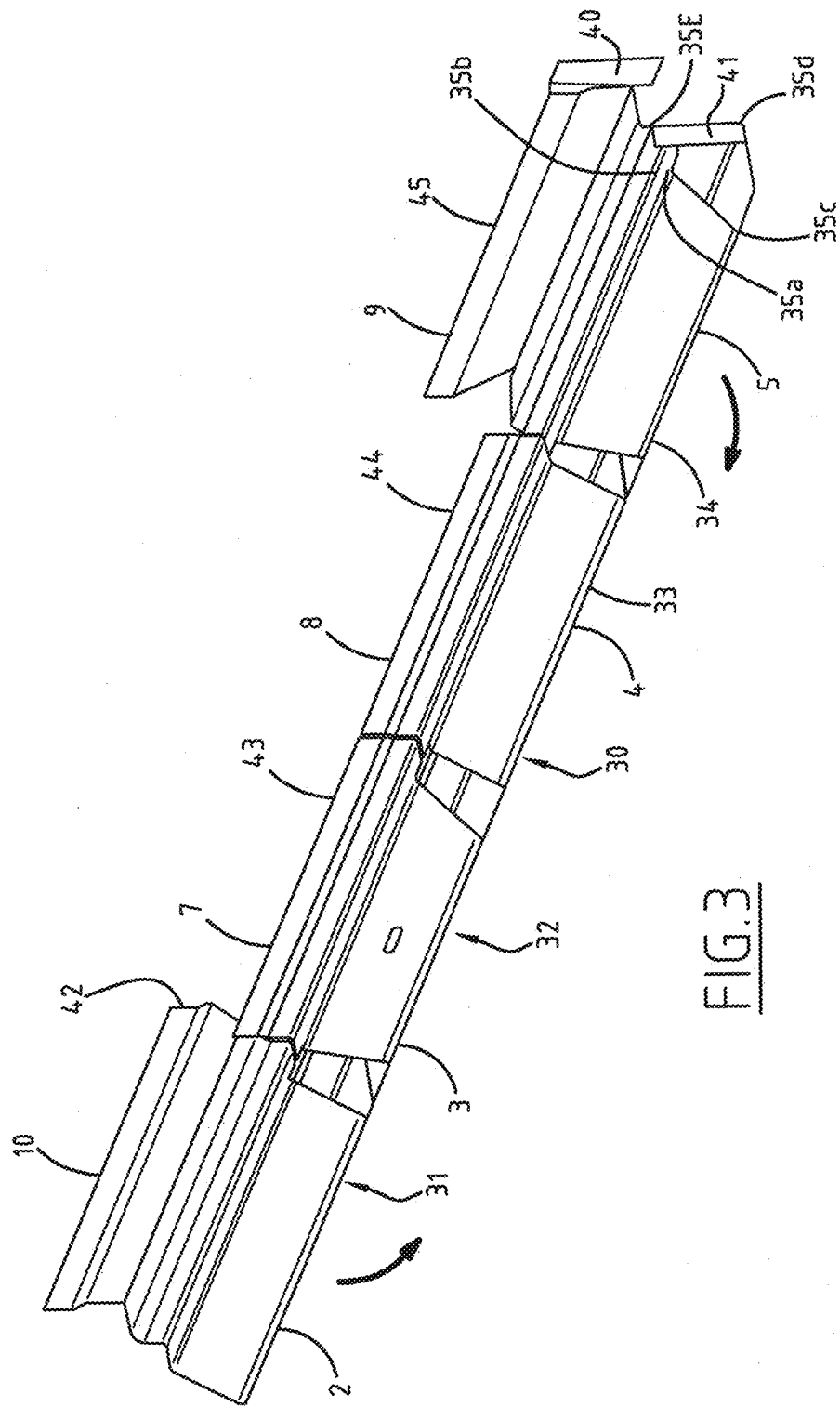
FIG. 3 is a perspective view of an intermediate phase of production of a frame for supporting a panel by means of a metal strip as shown in FIG. 2.

The frame as just described may be produced by differing means, in particular by folding a pre-cut metal strip such as the metal strip shown in FIG. 2.

The metal strip 30 shown in FIG. 2 is pre-cut so as to comprise four panels 31, 32, 33, 34 which are separated by vertical fold lines 36A, 36B and 36C and each intended, after being folded, to form the respective uprights 2, 3, 4, 5. This strip 30 comprises horizontal fold lines 35A, 35B, 35C, 35D, 35E, 35F and 35G extending along the entire length of the strip, allowing folds to be produced so as to form tubular units.

If the frame is intended to receive an electrically active panel which must be able to be connected to an external circuit, the panel 31 comprises an opening 37 which is intended to receive an external connection means 16, the panel 32 comprises an opening 39 which is intended to receive an internal connection means 14 and the panel 33 comprises an opening 38 which is intended to receive a second external connection means 17.

As shown in FIG. 4, in an intermediate phase of production, the precut strip 30 may be folded along longitudinal fold lines 35$a$, 35$b$, 35$c$, 35$d$, 35$e$, in particular to form tubular units corresponding to the panels 31, 32, 33 and 34. This unit can then be folded about vertical fold lines 36$a$, 36$b$, 36$c$ (not shown in the figure) so as to form a closed structure of generally rectangular shape. The panels comprise aprons 42, 43, 44 and 45 which, after being folded, can form flaps 10, 7, 8 and 9 respectively, as well as the external fins extending along uprights of the framework.

Once the structure just described has been produced, it forms a rectangular unit with flaps 41, 42, 43 and 44 to receive an electrical panel such as a photovoltaic panel 20 which is placed inside the framework and is connected by connecting the electrical output conductors 21 and 22 of the photovoltaic cell. These electrical connectors 21 and 22 are connected to the studs 14A and 14B of the internal connection means 14, as shown in FIG. 4.

Once the photovoltaic panel is disposed inside the framework and connected, the aprons 42, 43, 44 and 45 may be folded down and welded so as to hold the panel 20 securely in the framework or on the frame.

In order to be able to support photovoltaic panels which are subjected to weathering, under good conditions, the metal strip must consist of an alloy which has high mechanical characteristics, a coefficient of expansion which is preferably compatible with glass and preferably high resistance to atmospheric corrosion. The coefficient of expansion of the material constituting the frame should preferably be compatible with that of glass, in particular so as to reduce the shearing of the elastomeric seals disposed between the frame and the photovoltaic panel to produce the seal.

In service, these units can heat up very significantly, in particular under the influence of solar radiation, and this leads to expansion which can shear the seals if the coefficients of expansion are unsuitable.

The alloy may be, for example, of the type N485 defined in the standard ISO 6372, of which the coefficient of expansion of approximately $9.1 \times 10^{-6}$/K between 0° C. and 100° C. is close to that of glass and of which the elastic limit is of the order of 250 MPa. If the framework is produced with this alloy, of which the chemical composition basically comprises about 48% of nickel, 6% of chromium and 45% of iron, it must be protected from corrosion.

The alloy may also be a stainless steel of the type 316, for example, as defined in the standard NF EN 10088-2, of which the coefficient of expansion of approximately $16 \times 10^{-6}$/K between 0° C. and 100° C. is higher than that of glass and the elastic limit is approximately 200 MPa. This steel, which contains about 18% of chromium, 10% of nickel and 3% of molybdenum has a very high resistance to corrosion. Owing to its high coefficient of expansion, however, it is necessary to dispose an elastomeric seal between the photovoltaic panel and the framework in order to compensate for expansion gaps.

A further alloy which may be used is the steel F18 MT defined in the standard NF EN 10088-2 of which the coefficient of expansion of approximately $10.8 \times 10^{-6}$/K between 0° C. and 100° C. is close to that of glass. The elastic limit is approximately 220 MPa in the softened state and the corrosion resistance of this alloy is acceptable. This steel contains approximately 18% of chromium, 2% of molybdenum and 0.5% of titanium and/or niobium.

This list of possible alloys is not exhaustive, and the person skilled in the art can select the alloy which he deems to be best suited to each particular application.

In particular, a conventional steel of the carbon steel type may be used.

On the other hand, aluminium and its alloys are unsuitable for this application. These materials do not allow sufficient rigidity to be obtained and they would not withstand folding and would be difficult to weld.

To produce a framework of the type just described, a pre-cut strip with pre-folding lines and the necessary stamping is first prepared. The connectors which are overmoulded on the panels 31, 32 and 33 are then positioned. The set of connecting cables is then laid. It will be noted on the one hand that the presence of overmoulded connectors is not mandatory and depends on the envisaged use of the frames and, on the other hand, that the dispositions of the connectors, if any, may be different from those which have been described. The person skilled in the art knows how to adapt the particular embodiments of each frame to each use.

Once the strip is pre-cut with pre-fold lines, the necessary stamping is prepared, and optionally the connectors are overmoulded on the panels and the connecting cables are laid, the longitudinal folding is carried out so as to form profiled tubes which have the advantage of enclosing the cables if any.

Longitudinal laser welding is carried out. The four segments of tubes are then folded along connection lines so as to form the framework and join together the assembly by laser welding.

It will be noted that, in the example just described, the peripheral structure is produced from a single strip. However, it is possible to produce a structure using a plurality of strips which may each be folded, the differing units obtained thus being assembled at a later stage.

The shape of the strips and the number of pre-fold lines obviously depend on the particular geometry selected for the framework.

This method has the advantage of allowing the production of very light hollow frameworks or structures which are at the same time extremely rigid. In addition, it allows the production of such structures to be easily automated. It is described generally in the French patent application FR 00 09334.

Figure 12:
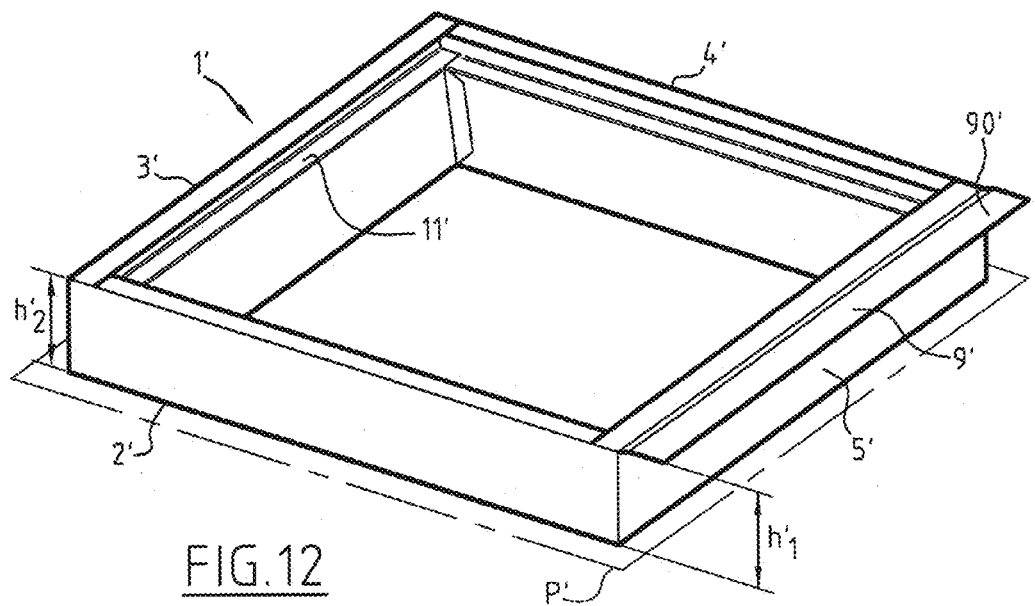
FIG. 12 is a schematic view of a second embodiment of a supporting frame for panels.
Figure 13:
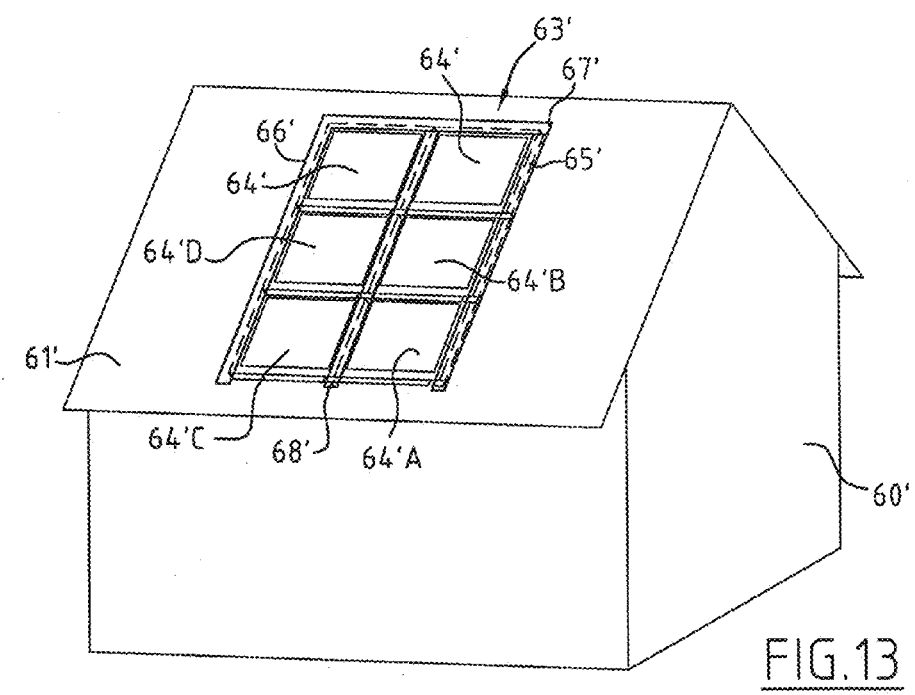
FIG. 13 is a schematic view of an assembly on the roof of a house of a set of supporting frames of the type shown in FIG. 12.

A second embodiment of the frame will now be described more succinctly. This embodiment is shown in FIG. 12 and like the previous embodiment can be produced by the method of folding one or more pre-cut metal strips which are assembled after folding by welding, such as laser welding.

The frame, as in the previous case, may be used to support differing types of panel and in particular electrically active panels such as photovoltaic panels. If necessary, it can comprise external and internal electrical linking means comprising electrical connections and electrical links which are concealed inside its uprights.

The frame comprises a peripheral structure 1' which forms a framework and comprises four uprights 2', 3', 4' and 5', of which a single upright, the upright 5' comprises a flap 9' extending toward the exterior so as to form a fin 90'. The height h'1 separating the reference plane P' and the lower face of the external fin 90' is greater than or equal to the height h'2 extending between the upper face of the upright 3' and the reference plane P', so that an upright of the type 3' of a first frame can be inserted below the fin 90' of an upright of a second frame adjacent to the first.

The uprights comprise a peripheral groove 11' intended to receive a panel such as an electrically active panel, and in particular a photovoltaic panel.

As in the previous case, the frame can comprise internal and external electrical connection means which are linked together by electrical linking means concealed in the uprights.

Frames of this type may be assembled on a wall of a building 60', this wall being, for example, a roof pan 61', so as to form a surface which is covered with panels 64', for example photovoltaic panels which are interconnected so as to form a generator for producing electricity by using solar energy.

This set of panels 64' comprises, in particular, the panels 64'A, 64'B, 64'C and 64'D which are disposed side by side. The panel 64'B is disposed upstream of the panel 64'A, the panel 64'C is disposed to the side of the panel 64'A and the panel 64'D is disposed above the panel 64'C. As shown more clearly in FIG. 14, the fins 90'B and 90'D extending toward the exterior along the uprights 5'B and 5'D of the panels 64'B and 64'D are superimposed above the uprights 3'A and 3'C respectively of the frames 64'A and 64'C. The two panels 64A and 64B disposed one above the other and the panels 64C and 64D, also disposed one above the other, are separated by a space, on which the seal is to be provided.

Figure 14:
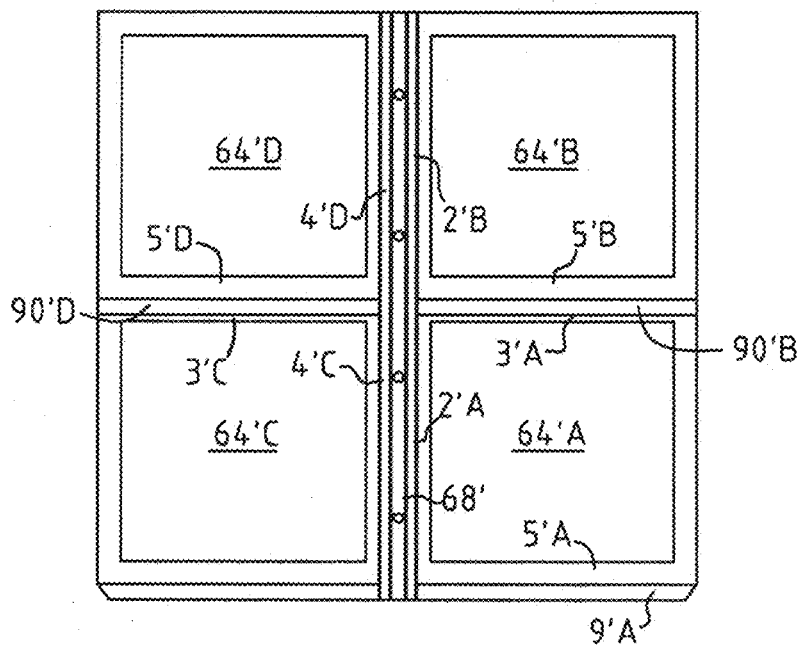
FIG. 14 is a schematic view from above of four frames of the type shown in FIG. 12 disposed adjacently on the roof of a building.
Figure 15:
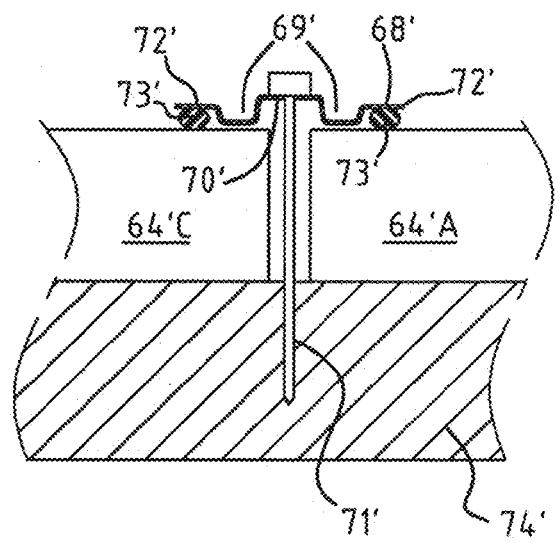
FIG. 15 is a cross-section of the assembly of panels shown in FIG. 14.

Referring to FIGS. 14 and 15, this seal is provided by a gutter 68' which is formed by a strip that is profiled so as to comprise two downwardly extending ribs 69' separated by a central rib 70' which extends along the profile. The central rib 70' comprises holes for receiving fixing means 71' for fixing the unit on a support 74'. The head of the fixing means 71' rests on the central rib 70' which is located above downwardly extending ribs 69'. As a result, the water flowing in the ribs 69' cannot penetrate the holes through which the fixing means 71' pass through the gutter. These gutters 68' comprise fins 72' which extend laterally on either side of and above the downwardly oriented ribs 69' and overlap the edge of the panels 64'A and 64'C. Seals 73' are disposed between the frames 64'A and 64'C on the one hand and the gutter 68'. With this arrangement, the seal between the differing panels can be provided. In the case of the panels which are disposed in a column one above the other, the seal is provided by the external fins of the upstream frames overlapping the downstream frames and, between two adjacent columns of frames, by the gutter disposed in the region of the joint between these two columns of frame.

As in the previous case, to produce the seal at the periphery of a surface which is covered by panels supported by frames as just described, a masking angular steel portion 67' is disposed on the upper edge of such a surface and angled steel portions 65' and 66' which cover the edge of the frames are disposed on the lateral faces. Sets of frames which support panels, in particular electrically active panels such as photovoltaic cell panels, are thus obtained and can be disposed on roof pans or on the façades of a building while producing a good seal against rain in particular.

The frames as just described can have differing shapes which the person skilled in the art knows how to adapt. Differing embodiments are possible, in particular the described mode of production by folding metal strips. However, differing methods of production from metal strips are possible, in particular the cutting of the strips may be adapted by the person skilled in the art as a function of the manufacturing constraints or the geometric constraints of the frame to be produced. In particular, the frames may be produced from a single cut and folded strip or from a plurality of strips which are cut and folded then assembled after folding. Welding is required in all cases and may be carried out in particular using a laser, for example by transparency, but may also be carried out by any other process.

If necessary, the assemblies used to rigidify the set once the folds have been produced may also be means for fixing by any other processes such as stapling or clinching.

In addition, the person skilled in the art will understand that the frameworks comprise at least three sides. For example, they may comprise three sides, four sides or six sides, in order to have triangular, square, rectangular, lozenge or hexagonal shapes allowing the production of pavings by juxtaposition of identical elements.

The invention claimed is:

1. Supporting frame for a panel, said supporting frame comprising:
a peripheral structure for receiving said panel, said structure comprising at least three uprights forming a framework, the framework having a lower face forming a reference plane, each upright having a lower face and an opposite upper face,
wherein at least a first upright comprises a first fin extending along the entire length of said first upright and out from an exterior surface of the framework, said first fin extending parallel to an upper face of the framework, said first fin delimiting a lower housing, said lower housing opening in the reference plane,
wherein the supporting frame further comprises internal and external connectors and an electrical link between the internal and external connectors, said electrical link being disposed inside the peripheral structure,
wherein a height between a lower face of the first fin and the reference plane of the framework is greater than the height between the reference plane of the framework and an upper face of an upright located opposite the first upright, whereby said first fin is adapted to extend above an upright of an adjacent supporting frame, said upright being received in said lower housing.

2. Supporting frame for a panel according to claim 1, wherein the framework consists of at least one precut, stamped and folded metal strip which is assembled by welding, in particular by laser welding.

3. Supporting frame for a panel according to claim 1, wherein a second upright adjacent to the first upright comprises a second fin extending along the entire length of the second upright and toward the exterior of the framework, said second fin extending parallel to the upper face of the framework.

4. Supporting frame for a panel according to claim 3, wherein at a joint between the first and second uprights, the first fin extends toward the exterior of the framework parallel to the longitudinal direction of the first upright so as to form a joint between the first and second fins in such a way that the first and second fins form a continuous fin extending along a corner of the framework formed by the first and second uprights.

5. Supporting frame for a panel according to claim 4, wherein the joint between the first and second fins comprises a stamped region toward the top of the framework and adapted to be fitted on at least one end of a fin extending toward the exterior of a framework.

6. Supporting frame for a panel according to claim 4, wherein the ends of the first and second fins located opposite the region of the joint between the first and second fins are cut at 45°.

7. Supporting frame for a panel according to claim 1, wherein a central portion delimited internally by the peripheral structure is open.

8. Supporting frame for a panel according to claim 1, wherein the supporting frame is intended to receive an electrically active panel such as a panel of photovoltaic cells and wherein the internal connectors and external connectors and the electrical link are adapted to electrically connect the electrically active panel carried by the frame to a circuit external to the frame.

9. Supporting frame for a panel according to claim 1, wherein the peripheral structure comprises, at an upper portion, a groove extending over an entire internal periphery of the peripheral structure and intended to receive the periphery of a panel.

10. Supporting frame for a panel according to claim 2, wherein the metal strip consists of an optionally lacquered, galvanized low-carbon steel.

11. Supporting frame for a panel according to claim 2, wherein the metal strip consists of austenitic stainless steel.

12. Supporting frame for a panel according to claim 2, wherein the metal strip is an alloy having controlled expansion of the iron nickel type or of the ferritic stainless steel type.

13. Supporting frame for a panel according to claim 2, wherein the metal strip consists of a material having a coefficient of expansion of between $4\times10^{-6}$/K and $11\times10^{-6}$/K compatible with that of glass.

14. External wall of a building comprising an assembly of supporting frames according to claim 1, wherein the assembly forms a paving.

15. External wall of a building comprising a frame assembly according to claim 14, wherein the assembly comprises at least one column of rectangular supporting frames disposed one above the other, and wherein an upper supporting frame and a lower supporting frame adjacent to the upper supporting frame are disposed in such a way that the first fin of the upper supporting frame extends above an upright of the lower supporting frame.

16. External wall of a building according to claim 15, wherein the frames each comprise a single fin, wherein the assembly of supporting frames comprises at least two adjacent columns of supporting frames extending along a height with a space between the two adjacent columns and wherein a gutter extends over said entire height and is disposed against lateral edges of the frames facing one another so as to overlap said space.

17. External wall of a building according to claim 15, wherein the frames each comprise a first and a second fins, wherein the assembly of supporting frames comprises at least two adjacent columns of supporting frames and wherein the second fins of the supporting frames of one column extends above uprights of the supporting frames of the other column.

18. External wall of a building according to claim 15, wherein masks extend at least along lateral edges and an upper horizontal edge of the assembly, overlapping the uprights of the supporting frames located at the periphery of the assembly.

19. External wall of a building according to claim 15, wherein seals are disposed between the uprights of supporting frames and the fins.

20. External wall of a building according to claim 15, wherein the external wall forms a roof and wherein the supporting frames support photoelectric panels.

* * * * *